US007823186B2

United States Patent
Pouliot

(10) Patent No.: US 7,823,186 B2
(45) Date of Patent: Oct. 26, 2010

(54) SYSTEM AND METHOD FOR APPLYING SECURITY POLICIES ON MULTIPLE ASSEMBLY CACHES

(75) Inventor: Sebastien Pouliot, Beauport (CA)

(73) Assignee: Novell, Inc., Provo, UT (US)

( * ) Notice: Subject to any disclaimer, the term of this patent is extended or adjusted under 35 U.S.C. 154(b) by 1098 days.

(21) Appl. No.: 11/509,052

(22) Filed: Aug. 24, 2006

(65) Prior Publication Data

US 2008/0072276 A1   Mar. 20, 2008

(51) Int. Cl.
G06F 17/00 (2006.01)
(52) U.S. Cl. .......................................................... 726/1
(58) Field of Classification Search ...................... 726/1; 713/2; 709/213, 217
See application file for complete search history.

(56) References Cited

U.S. PATENT DOCUMENTS

| | | | |
|---|---|---|---|
| 5,452,457 A | 9/1995 | Alpert et al. ................. 395/700 |
| 6,071,316 A | 6/2000 | Goossen et al. ................. 717/4 |
| 6,230,312 B1 | 5/2001 | Hunt ............................. 717/4 |
| 6,282,701 B1 | 8/2001 | Wygodny et al. .............. 717/4 |
| 6,308,275 B1 | 10/2001 | Vaswani et al. ............. 713/201 |
| 6,560,774 B1 | 5/2003 | Gordon et al. .............. 717/146 |
| 6,615,264 B1 | 9/2003 | Stoltz et al. ................. 709/227 |
| 6,802,054 B2 | 10/2004 | Faraj .......................... 717/128 |
| 6,871,284 B2 | 3/2005 | Cooper et al. ............... 713/200 |
| 6,971,091 B1 | 11/2005 | Arnold et al. ............... 717/145 |
| 7,069,554 B1 | 6/2006 | Stammers et al. ........... 717/178 |
| 7,171,655 B2 | 1/2007 | Gordon et al. .............. 717/146 |
| 7,487,221 B2 | 2/2009 | Araki ......................... 709/208 |
| 7,512,965 B1 | 3/2009 | Amdur et al. ................. 726/1 |
| 7,552,472 B2 | 6/2009 | Baffes et al. ................. 726/22 |
| 7,587,487 B1 | 9/2009 | Gunturu ..................... 709/224 |
| 7,590,684 B2 | 9/2009 | Herrmann ................... 709/203 |
| 7,620,940 B2 | 11/2009 | Goldsmith et al. .......... 717/127 |
| 7,725,922 B2 | 5/2010 | Pouliot .......................... 726/1 |
| 7,739,735 B2 | 6/2010 | Pouliot ......................... 726/21 |
| 7,743,414 B2 | 6/2010 | Pouliot ......................... 726/22 |
| 2002/0042897 A1 | 4/2002 | Klein et al. ................. 714/718 |
| 2002/0069200 A1 | 6/2002 | Cooper et al. ................. 707/9 |
| 2002/0198675 A1 | 12/2002 | Underseth et al. .......... 702/122 |
| 2003/0041267 A1* | 2/2003 | Fee et al. .................... 713/201 |
| 2003/0065942 A1 | 4/2003 | Lineman et al. ............ 713/201 |
| 2003/0110192 A1 | 6/2003 | Valente et al. .............. 707/513 |
| 2003/0115484 A1 | 6/2003 | Moriconi et al. ........... 713/201 |

(Continued)

OTHER PUBLICATIONS

Damianou, Nicodemos C., "A Policy Framework for Management of Distributed Systems", Thesis, Imperial College of Science, Technology and Medicine, University of London, Department of Computing, Feb. 2002, 233 pages.

(Continued)

Primary Examiner—Matthew B Smithers
Assistant Examiner—Ali S Abyaneh
(74) Attorney, Agent, or Firm—Pillsbury Winthrop Shaw Pittman LLP

(57) ABSTRACT

The invention relates to a system and method for providing multiple assembly caches for storing shared application resources. Each assembly cache may be associated with a different security policies, locations, internal structures and management. An application may be determined to have access to an assembly cache based on the permission and security policy of the application and security policy of the assembly cache. Additionally, one or more assembly caches may have other policies for cache retention, resolution, and creation.

20 Claims, 5 Drawing Sheets

U.S. PATENT DOCUMENTS

| | | | | |
|---|---|---|---|---|
| 2003/0177355 | A1 | 9/2003 | Elgressy et al. | 713/167 |
| 2003/0196114 | A1 | 10/2003 | Brew et al. | 713/201 |
| 2003/0225822 | A1 | 12/2003 | Olson et al. | 709/202 |
| 2004/0103323 | A1 | 5/2004 | Dominic | 713/202 |
| 2004/0250112 | A1 | 12/2004 | Valente et al. | 713/200 |
| 2005/0071668 | A1 | 3/2005 | Yoon et al. | 713/200 |
| 2005/0172126 | A1* | 8/2005 | Lange et al. | 713/166 |
| 2005/0240999 | A1 | 10/2005 | Rubin et al. | 726/22 |
| 2005/0262517 | A1* | 11/2005 | French | 719/316 |
| 2006/0064737 | A1 | 3/2006 | Wallace | 726/1 |
| 2006/0117299 | A1 | 6/2006 | Goldsmith et al. | 717/124 |
| 2006/0143396 | A1* | 6/2006 | Cabot | 711/134 |
| 2006/0150021 | A1 | 7/2006 | Traskov et al. | 714/37 |
| 2006/0235655 | A1 | 10/2006 | Qing et al. | 702/186 |

OTHER PUBLICATIONS

Oaks, Scott, "Java Security, $2^{nd}$ Edition", Publisher O'Reilly Media, Inc., May 17, 2001, 22 pages.

Clark, Jason, "Return of the Rich Client—Code Access Security and Distribution Features in .NET Enhance Client-Side Apps", *MSDN Magazine*, printed from http://msdn.microsoft.com/msdnmag/issues/02/06/rich/default.aspx, Jun. 2002, 16 pages.

Mono, "Mono:Runtime—The Mono Runtime", printed from http://www.mono-project.com/Mono:Runtime, Jan. 24, 2006, 8 pages.

Mono, "Assemblies and the GAC—How Mono Finds Assemblies", printed from http://www.mono-project.com/Assemblies_and_the_GAC, Jul. 20, 2005, 11 pages.

Zone Labs "Technical Support Tech Notes: Protection Against Advanced Firewall Bypass Techniques", printed from http://www.zonelabs.com/store/content/support/technote, Aug. 23, 2006, 3 pages.

Zone Labs "Zone Labs PASS Program" printed from http://www.zonelabs.com/store/company/partners/passFAZ.jsp, Aug. 23, 2006, 1 page.

Sundmark et al., "Monitored Software Components—A Novel Software Engineering Approach", *Proceedings of the 11<sup>th</sup> Asia-Pacific Software Engineering Conference* (APSEC'04), Nov. 30-Dec. 3, 2004, pp. 624-631.

Sokolsky et al., "Steering of Real-Time Systems Based on Monitoring and Checking", *Proceedings of the Fifth International Workshop*, Nov. 18-20, 1999, pp. 11-18.

* cited by examiner

SYSTEM AND METHOD FOR APPLYING SECURITY POLICIES ON MULTIPLE ASSEMBLY CACHES

FIELD OF INVENTION

The invention relates generally to the storage of executable code in assembly caches, and more particularly to a system and method for concurrently accessing different types of assembly caches, each controlled by different security policies.

BACKGROUND

Resources exist for software programmers and developers to create Internet compatible services, software, and applications (e.g., Microsoft .NET Virtual Machine). Different programming languages may be used in writing such services, software and applications. They usually require the use of many modules and/or components (e.g., .DLL, .EXE) for successful execution on a computer. According to the European Computer Manufacturer's Association (ECMA) standards in an ECMA-335 virtual machine (VM) these components are called assemblies. Assemblies are the basis for developing, deploying, and running applications. When an application is executed the VM should have the ability to locate the assemblies and resources necessary to run the application. One common approach is to store common assemblies in a centralized or global assembly cache (GAC) within the computer where the VM is installed. A global assembly cache allows assemblies to be shared by several applications on the computer. Most basic assemblies, for example, the .NET framework, are installed in the GAC. The GAC may also store multiple versions of code (e.g., different code versions, different code cultures versions). Assemblies within the GAC are resources that are also fully trusted as secure to run on a machine by all applications. However, an application does not necessarily have to be fully trusted to use the GAC. In such instances, a security manager prevents untrusted applications from accessing trusted items through a trusted GAC assembly via a stack walk, which checks every callers, from every assemblies, for the required permissions, or throw a security exception.

An application may be assigned a set of permissions corresponding to one or more code groups that the application belongs to based on application characteristics, known as evidence. Evidence includes, but is not limited to, name, publisher, and/or origin of the application. For example, code from the local computer may have unrestricted permissions and thus be fully trusted, whereas code from the Internet will receive limited permissions characterized by an Internet permissions set (e.g., partially trusted). FIG. 1 illustrates un-trusted, semi-trusted, and trusted applications according to known prior art systems. As shown, un-trusted applications may be from external network such as the Internet. Semi-trusted application may be from an internal network such as an intranet and trusted applications may be local to a computer.

The GAC employs a static immutable security policy wherein all assemblies require strongnames (e.g., need to be digitally signed) and are fully trusted to be shared or else they can not be placed in the GAC. To prevent malicious applications and/or code from accessing secure resources (e.g., assembly files in assembly cache), the assemblies stored in the GAC can not depend on assemblies outside the GAC, which could have less than full trust. Thus an application and/or code not having full trust does not receive the benefit of a shared cache system, rather, these applications store their respective assemblies in one or more private, and often unshared, assembly directories. This can create inefficient use of memory (e.g., small devices like cellphones) and versioning problems.

As developers begin to create applications and web services with code executed from a partially trusted context or called by partially trusted code, there is no present way to increase efficiency in addressing commonly shared assemblies for less than fully trusted application code and/or assemblies. Multiple GAC's, also known as Multiple Assemble Caches (MAC) have been implemented in some VM (e.g. the Mono VM) to address separate assembly caches more consistently. This provides software to develop and run client and server applications on Linux, Solaris, Mac OS X, Windows, Unix, and/or other operating systems. Currently, however, multiple assembly caches are not addressed with respect to security—they are simply multiple instances of the original GAC concept. Therefore, there is no present way for securely increasing the efficiency of shared assemblies.

SUMMARY

Various aspects of the invention overcome at least some of these and other drawbacks of known systems. According to one embodiment of the invention, a system is provided for a method of storing application runtime resources within multiple assembly caches, assigning a security policy to one or more of the multiple assembly caches; running an application and retrieving and selecting the corresponding assembly candidates from the various assembly caches.

According to another embodiment of the invention, a system is provided for a method of receiving assembly information; determining a security policy for the assembly; transparently caching the assembly within one of a multiple of assembly caches based on a security policy of the assembly cache or creating a new assembly cache with a security policy to match the application resources.

According to another aspect of the invention, each of the multiple assembly caches can have its own requirements on the assemblies and resources it stores. One or more of the multiple assembly caches may be assigned a security policy according to one or more policies relating to enterprise level, machine level, user level, and application level information. A security policy for an assembly and/or application resource may also be determined in order to allow the caching of the assembly and/or application resource into a corresponding assembly cache. If a corresponding assembly cache with same or similar security policy does not exist, one may be created. Therefore, an assembly used to run an application may be cached and shared by more than one application.

An advantage of the invention is that it allows secure sharing of more application resources by more applications, thus reducing storage consumption for each application installed on the computer.

Another aspect of the invention includes creating other types of policies (e.g., cache retention, cache priority, replication, etc.) for one or more of the assembly caches. This may allow more control over managing cached information.

Another aspect of the invention includes an optimization in the file hierarchy structure being used for the GAC. For example, as more caches are added to a VM this also augments the time required to search for an assembly as each cache must be verified. The prior art structure is a multi-level complex hierarchy which requires multiple reads to find any assembly in a single cache. Such a design does not scale to support multiple caches. Thus, according to the invention, different types of cache may be implemented to use different storage strategy (e.g. non file based) including using a flat file-based structure, which permits a single read operation for lookups, or the use of more advanced structures (e.g., replicated databases) to gain faster assembly lookup and other management advantages.

DETAILED DESCRIPTION

Figure 1:
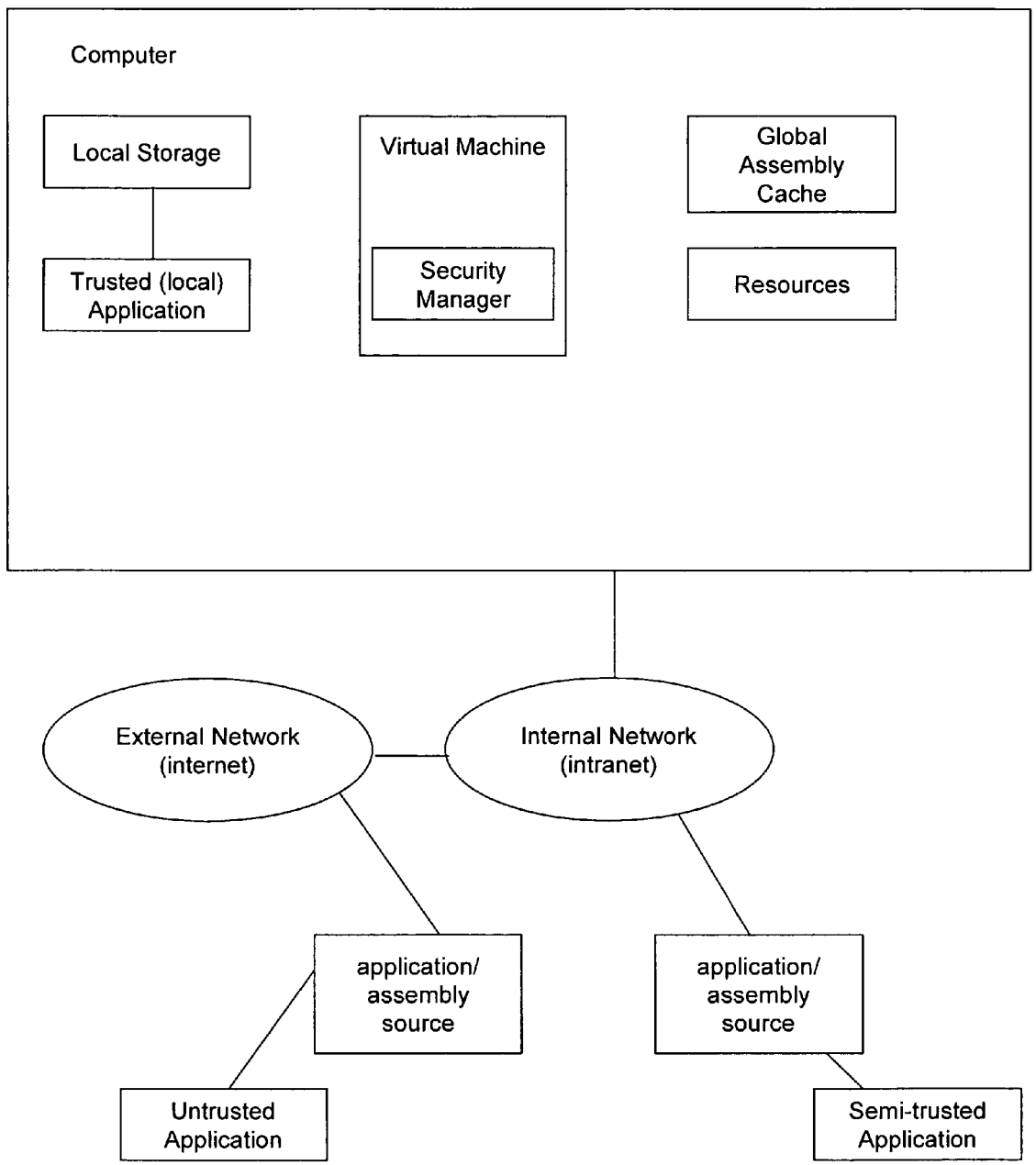
FIG. 1 is a high level diagram of the prior art Global Assembly Cache system.
Figure 2:
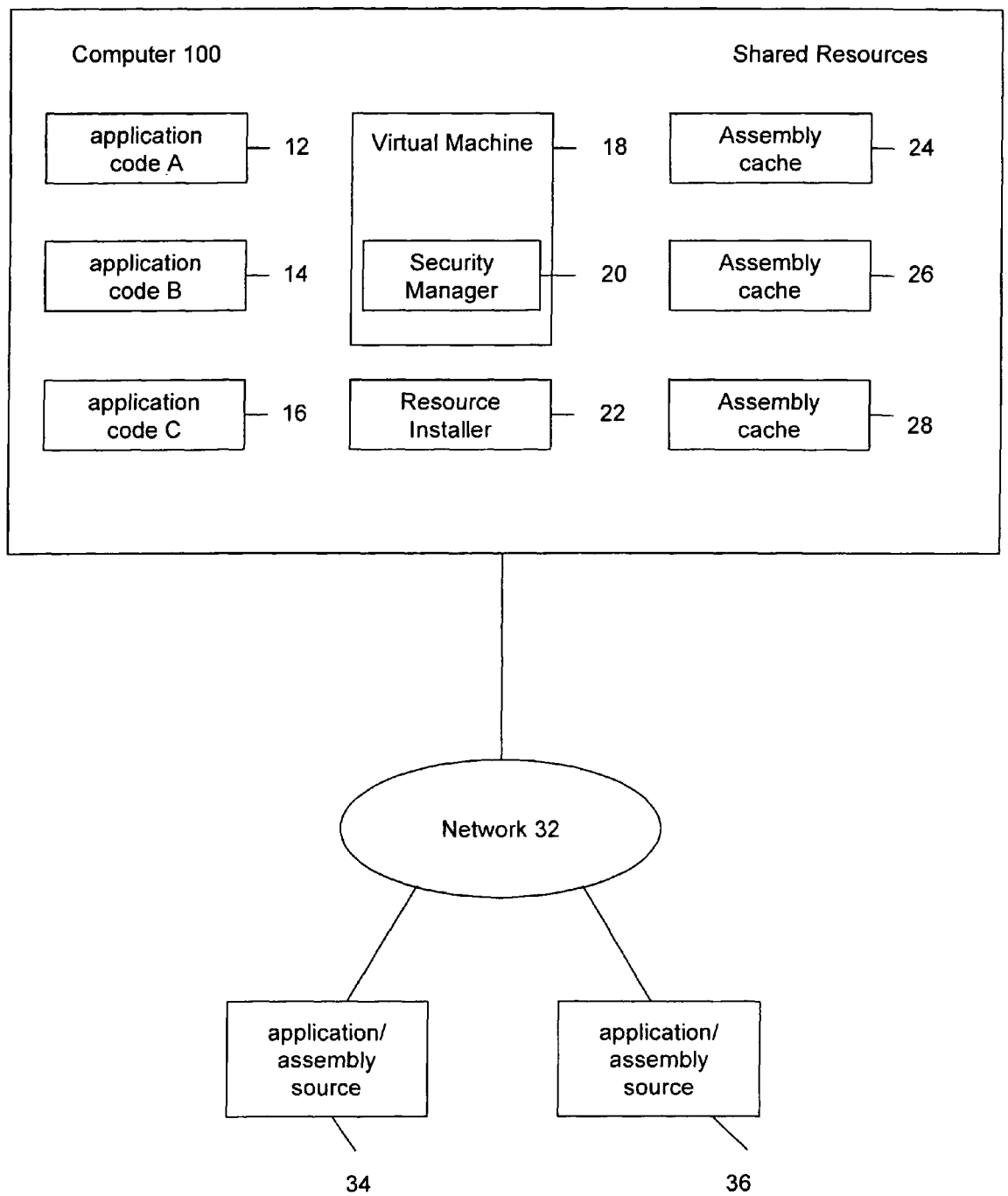
FIG. 2 is a high level block diagram of a system, according to one embodiment of the invention.

FIG. 2 depicts a computer (100) with multiple applications (12-16). As commonly known, applications may vary with respect to function and ability. Applications (12-16) and the resources needed to execute the applications may be locally available in an assembly cache (24-28) or downloaded to a computer from an application source (34) through a network connection (32). Other sources may be included (e.g., hard disk, CD, drive storage). The application resources, which may be received with the application, refer to application assembly including, for example, .EXE files and .DLL files, among other resources. Application code and the resources used for execution on a computer may originate from various sources that may be considered as secure, un-secure, or semi-secure.

Execution of applications may be carried out using a VM 18 (e.g., Common Language Runtime, ECMA runtime, etc.). A security manager 20 allows the VM 18, at runtime, to configure the rights to one or more permissions (e.g., User Interface, Web Access, Printing, etc.) allowed to an application based on application characteristics (e.g., code group). The VM 18 and security managers 20 are generally known in the art. A novel aspect of the system includes the use of concurrent multiple assembly caches (24-28) by a single application. A Resource Installer 22 may be used to install resources (e.g., assembly files) into one or more assembly caches 24-28.

An application may include one or more assemblies needed for the application to run properly. One or more applications may share their assemblies with other applications running on the computer. Assemblies and/or application resources may be installed into assembly caches 24-28 to facilitate this sharing between applications while conserving their own security policies. Like the one or more applications they are used for, assemblies may come from various sources including, but not limited to, internet, intranet, local computer, remote server, and/or readable media. The assembly caches may be used to separately store assemblies into respective caches based on the source from which the assembly came, along with other factors that may be determined by a security policy. For example, an Internet assembly cache may be created with security policy and permissions relating to assemblies from the Internet.

A security policy may consist of a series of permissions and rights from various policy levels. An assembly's granted and refused permission sets are resolved, at runtime, by the security manager 20 using the permissions found in all (or some) policy levels including enterprise, machine, user and application domain policy levels. Policy levels are applied based on the membership of the assembly with defined identity, publisher, source (e.g., URL, website), origin (e.g., Internet, Intranet) and/or other information. Each policy level that an assembly belongs to may define permissions. The combination of permissions may be referred to as a permission set. Rights may also be assigned according to policy level and/or other assembly information.

An assembly cache may be associated with any security policy. In fact, each assembly caches may be associated with a different security policy. The security policy may be a combination of permissions from one or more of an enterprise, machine, user or application domain policy level. Policies and permissions on the enterprise level may apply to all (or some) computers of the network. Unique machines on the network may require a machine policy and permissions that are not addressed under enterprise policy. A user policy and permissions may apply to an individual user that logs in to the computer. Application level policy and permissions may be defined by the application developer to ensure optimal functionalities of the application. The combination of enterprise, machine, user, application, and/or other policies determine the set of permissions a security policy may enforce for an assembly cache. A security policy may be predetermined and characterized by name.

Figure 3:
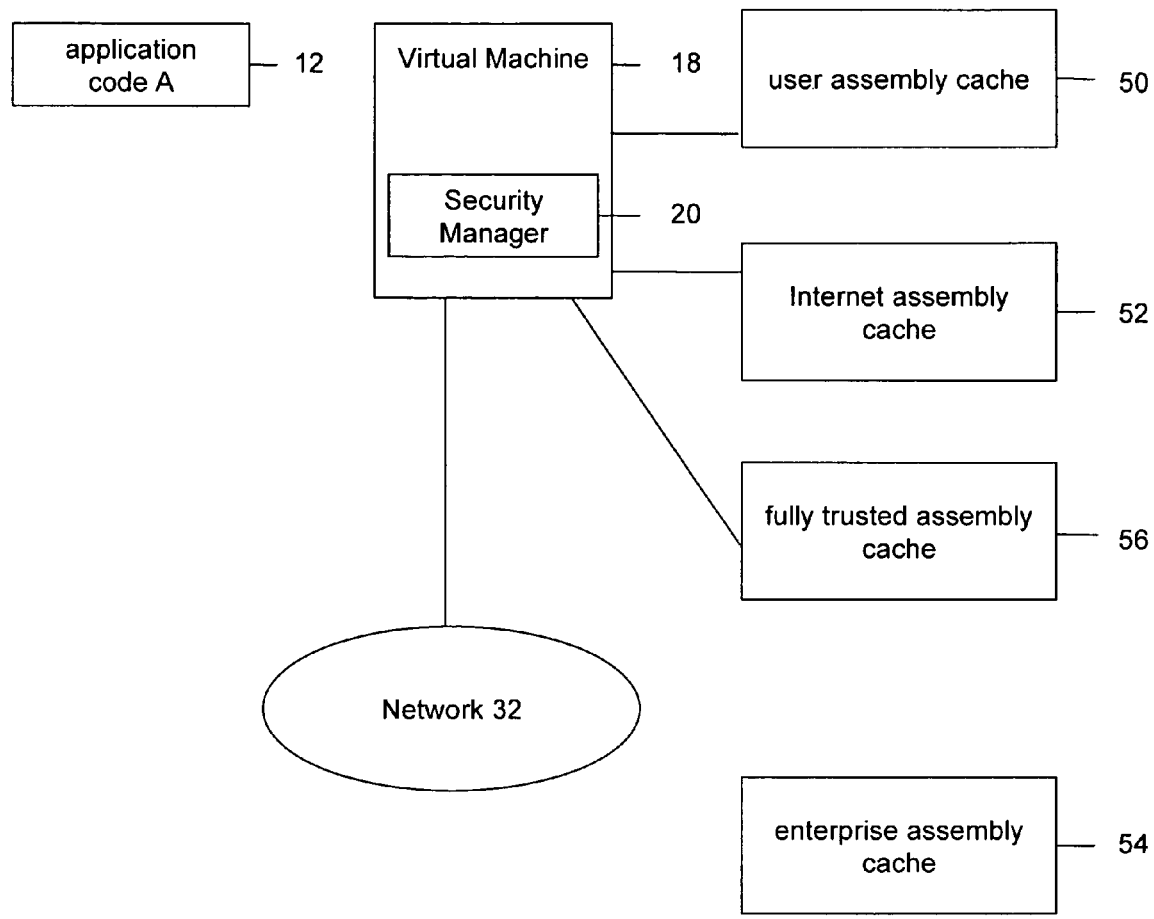
FIG. 3 is a block diagram of multiple assembly caches, according to one embodiment of the invention.

FIG. 3 is a block diagram of multiple assembly caches, according to one example of the invention. A user assembly cache 50 may be shared by multiple users of the system having the same or similar user level permissions. An Internet assembly cache 52 may be used for assemblies downloaded from the Internet. Assemblies stored in the Internet assembly cache 52 may have higher restrictions since assemblies from the Internet may be less trusted. Enterprise assembly cache 54 may be for assemblies coming from trusted company intranet or local network. Such a cache may be implemented remotely on an enterprise server or, in a hybrid mode, appear as a local cache to the VM while residing on a remote server. A fully trusted assembly cache (56) would be the equivalent of the currently existing global assembly cache (GAC).

Figure 4:
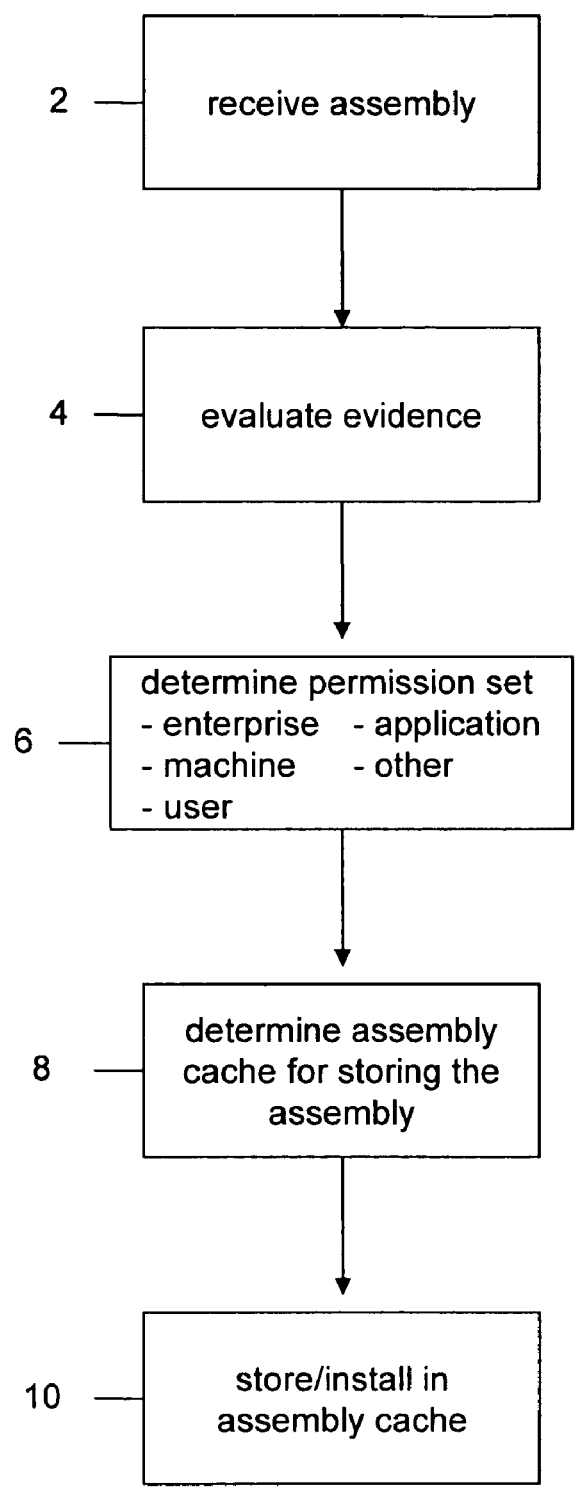
FIG. 4 is flow chart for a method storing assemblies into assembly cache, according to one embodiment of the invention.

FIG. 4 illustrates one method for installing an assembly into an assembly cache based on its evidence. An assembly may be received from a source (e.g., known or unknown). The assembly may be installed into an assembly cache (e.g., via resource installer) (operation 2) based on assembly identity, publisher, source, origin, and/or other information. This operation may be carried out to install an assembly (operation 4) and determine the permission set allowed for an assembly (operation 6). The resulting permission set may be compared to the permissions required by a security policy of an assembly cache (operation 8). If a match between the assembly permission set and the assembly cache's permission set is observed then the assembly is installed into the corresponding assembly cache for future use by multiple applications (operation 10). A match may be determined to varying degrees. If a majority of the permissions are the same or at least similar to the security policy, a positive match may be determined. If no corresponding assembly cache exists (not shown in figure), then the assembly may not be suitable for sharing and thus stored into a private directory or else the assembly permission set may be modified to fit into an existing assembly cache.

The permissions assigned to an application at runtime may be compared to the permission set of an assembly cache. Rights may be further enforced upon access. Thus, one or more applications operating according to the same or similar permissions set (security policy) may share resources from a commonly shared assembly cache without having to create private resource directories for each application. Additionally, the application(s) may be restricted from accessing secure shared resources for which they do not have the appropriate permissions and permissions rights.

One or more applications may access one or more of the assembly caches during runtime. By way of example, application code originating from the Internet (e.g., unsecured source) may have limited permissions with respect to actions that may be performed. An application can potentially access assemblies from any cache based on the security manager's (20) restriction which, intersect the application permission set with the one from the assembly cache, and any other restriction of assembly itself could have. This prevents the application from being granted elevated rights. In another example, an application at runtime may be fully trusted and have unrestricted rights on permissions to perform any number of actions. An attempt by the fully trusted application to access an assembly cache with less trusted resources may, at first glance, seem unproductive since the fully trusted application would not be able to perform all the actions necessary for proper function of the application. The security policy of the assembly cache would not allow all the requested permissions to execute. However, this functions to contain un-trusted, or semi-trusted, code because it makes sure that the application will not supply permissions higher than what the assembly cache provides.

Figure 5:
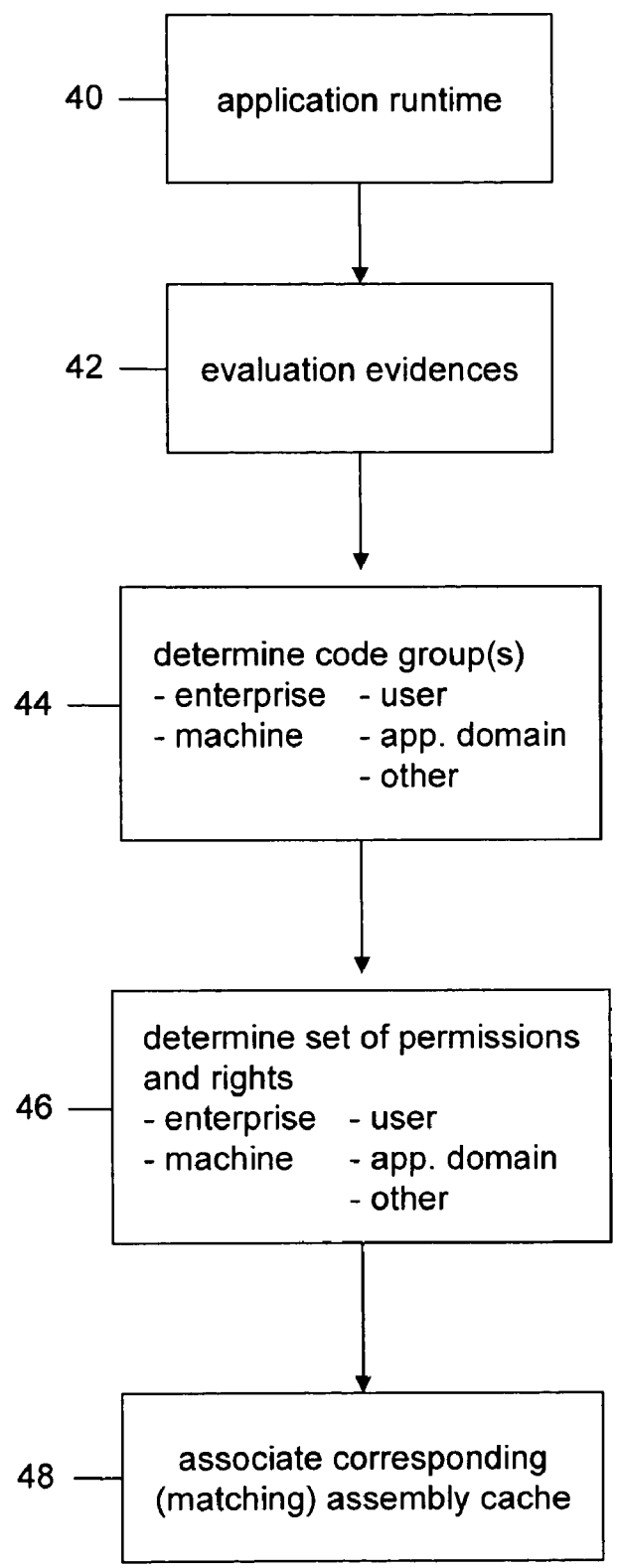
FIG. 5 is a runtime application method, according to one embodiment of the invention.

FIG. 5 is a flow chart for a method performed during application runtime, according to one embodiment of the invention. An applications permission set and security policy may be determined at runtime (e.g., using security manager). An application having a security policy may access an assembly cache having a similar security policy. An application is launched (operation 40) either by the operating system, which will start a new VM, or directly by an existing VM instance. The application may be evaluated based on evidence from the application code including, but not limited to, identity, publisher, source (e.g., URL, website), origin (e.g., Internet, Intranet) and/or other information (operation 42). The evidence from the application may be used to resolve the permissions of the application according to one or more of an enterprise, machine, user, and/or other policy level (operation 44). The resulting permission set may be matched to a transparent assembly cache which has the same or similar permissions in the form of a security policy (operation 48). The operation of FIG. 5 may allow applications running on a machine to share code resources (e.g., assemblies) securely and more efficiently with respect to application characteristics.

Each assembly cache may further have configurable rules for assembly resolution (e.g. cache priority), assembly retention (e.g., Internet cache), and assembly creation (e.g. transparent cache, cache using digital signatures). The rules may aid in keeping assembly caches up to date with current application running on a system and for maximizing use of shared memory.

In order to reduce the performance impact of delays introduced with multiple assembly caches, some instances of the multiple assembly caches may be implemented using a flat naming structure. Shared assemblies stored in the assembly cache may be called from other code named using name, version, culture, and public key token, among other things, in one long string rather than in complicated hierarchical directories of the prior art. Thus, for some multiple assembly caches the assemblies are simple, faster to browse, and easier to cache.

In the foregoing specification, the invention has been described with reference to specific embodiments thereof. Various modifications and changes may be made thereto without departing from the broader spirit and scope of the invention. The specification and drawings are, accordingly, to be regarded in an illustrative rather than a restrictive sense.

I claim:

1. A system for applying security policies on multiple assembly caches, comprising:
   a plurality of assembly caches assigned a plurality of separate policy levels, wherein the plurality of assembly caches separately store one or more a plurality of application resources having permissions matched to the plurality of separate policy levels assigned to the plurality of assembly caches; and
   a computer having a virtual machine configured to:
      resolve a permission set that grants rights to an application executing in the virtual machine, wherein the application executing in the virtual machine requires a subset of the plurality of application resources that are stored in one or more of the plurality of assembly caches; and
      retrieve the subset of the application resources required by the executing application from the one or more assembly caches in response to determining that the resolved permission set intersects the separate policy levels assigned to the one or more assembly caches.

2. The system of claim 1, the computer further having a resource installer configured to:
   match the permissions assigned to the plurality of application resources to the plurality of separate policy levels assigned to the plurality of assembly caches; and
   install the plurality of application resources into the plurality of assembly caches with the policy levels matched to the permissions assigned to the plurality of application resources.

3. The system of claim 2, wherein the resource installer is further configured to:
   create a new assembly cache in response to at least one of the plurality of application resources having permissions that do not match any of the separate policy levels assigned to the plurality of assembly caches, wherein the new assembly cache has a policy level matched to the permissions assigned to the at least one application resource; and
   install the at least one application resource into the new assembly cache with the policy level matched to the permissions assigned to the at least one application resource.

4. The system of claim 1, wherein a plurality of separate security policies define the plurality of separate policy levels assigned to the plurality of assembly caches.

5. The system of claim 1, wherein the plurality of assembly caches separately store the plurality of application resources with in a flat naming structure that permits single read lookup operations.

6. The system of claim 1, wherein the plurality of assembly caches separately store the plurality of application resources remotely from to the virtual machine.

7. The system of claim 1, wherein the plurality of assembly caches separately store the plurality of application resources in a plurality of replicated databases.

8. The system of claim 1, wherein the plurality of assembly caches include one or more priority, retention, or creation rules that control separately storing the plurality of application resources in the plurality of assembly caches.

9. The system of claim 2, wherein the resource installer is further configured to:
identify at least one of the plurality of application resources having permissions that do not match any of the separate policy levels assigned to the plurality of assembly caches;
modify the permissions assigned to the at least one application resource to match the separate policy level assigned to one of the plurality of assembly caches; and
install the at least one application resource into the at least one assembly cache with the policy level matched to the modified permissions assigned to the at least one application resource.

10. The system of claim 2, wherein the resource installer matches a majority of the permissions assigned to at least one of the plurality of application resources to the separate policy level assigned to at least one of the plurality of assembly caches and installs the at least one application resource into the at least one assembly cache with the policy levels matched to the majority of the permissions assigned to the at least one application resource.

11. A method for applying security policies on multiple assembly caches, comprising:
assigning a plurality of separate policy levels to a plurality of assembly caches, wherein the plurality of assembly caches separately store one or more of a plurality of application resources matched to the plurality of separate policy levels assigned to the plurality of assembly caches;
resolving a permission set that grants rights to an application executing within a virtual machine on a computer, wherein the application executing in the virtual machine requires a subset of the application resources that are stored in one or more of the plurality of assembly caches; and
retrieving the subset of the application resources required by the executing application from the one or more assembly caches in response to determining that the resolved permission set intersects the separate policy levels assigned to the one or more assembly caches.

12. The method of claim 11, further comprising:
matching the permissions assigned to the plurality of application resources to the plurality of separate policy levels assigned to the plurality of assembly caches; and
installing the plurality of application resources into the plurality of assembly caches with the policy levels matched to the permissions assigned to the plurality of application resources.

13. The method of claim 12, further comprising:
creating a new assembly cache in response to at least one of the plurality of application resources having permissions that do not match any of the separate policy levels assigned to the plurality of assembly caches, wherein the new assembly cache has a policy level matched to the permissions assigned to the at least one application resource; and
installing the at least one application resource into the new assembly cache with the policy level matched to the permissions assigned to the at least one application resource.

14. The method of claim 12, further comprising:
identifying at least one of the plurality of application resources having permissions that do not match any of the separate policy levels assigned to the plurality of assembly caches;
modifying the permissions assigned to the at least one application resource to match the separate policy level assigned to one of the plurality of assembly caches; and
installing the at least one application resource into the at least one assembly cache with the policy level matched to the modified permissions assigned to the at least one application resource.

15. The method of claim 12, wherein a resource installer operating on the computer matches a majority of the permissions assigned to at least one of the plurality of application resources to the separate policy level assigned to at least one of the plurality of assembly caches and installs the at least one application resource into the at least one assembly cache with the policy levels matched to the majority of the permissions assigned to the at least one application resource.

16. The method of claim 11, wherein a plurality of separate security policies define the plurality of separate policy levels assigned to the plurality of assembly caches.

17. The method of claim 11, wherein the plurality of assembly caches separately store the plurality of application resources with in a flat naming structure that permits single read lookup operations.

18. The method of claim 11, wherein the plurality of assembly caches separately store the plurality of application resources remotely from the virtual machine.

19. The method of claim 11, wherein the plurality of assembly caches separately store the plurality of application resources in a plurality of replicated databases.

20. The method of claim 11, further comprising assigning one or more priority, retention, or creation rules to the plurality of assembly caches, wherein the priority, retention, or creation rules control separately storing the plurality of application resources in the plurality of assembly caches.

* * * * *